Patented Dec. 3, 1929

1,738,163

UNITED STATES PATENT OFFICE

HARRY M. WILLIAMS, OF DAYTON, OHIO, ASSIGNOR TO GENERAL MOTORS RESEARCH CORPORATION, OF DETROIT, MICHIGAN, A CORPORATION OF DELAWARE

BEARING

No Drawing.   Application filed April 11, 1927.   Serial No. 183,007.

This invention relates to porous metal bodies which are suitable for use as bearings or other bodies intended to be used in rubbing contact with a relatively movable member and particularly the materials which are capable of absorbing substantial quantities of lubricant which is supplied automatically to the bearing surfaces as needed.

This application is a continuation in part of my copending application Serial No. 98,601, filed March 30, 1926.

One type of bearing material to which this invention relates is disclosed in my copending application Serial No. 582,550, filed August 17, 1922, which discloses a porous metal bearing composed of particles of alloyed metals and particles of graphite throughout which there are a relatively large number of minute intercommunicating voids. The mass is capable of absorbing several per cent of its own weight of lubricant which the mass gives out to the bearing surface as needed.

In one form of bearing, metallic powders, such as copper powder and tin powder, are thoroughly mixed with finely divided graphite and a volatile void forming substance, such as salicylic acid. The ingredients should be sufficiently fine to pass through a 200 mesh screen. The ingredients are intimately mixed and are briquetted into the desired form under high pressure, for example, 75,000 pounds per square inch. The formed body is then heated in a non-oxidizing atmosphere to a temperature sufficient to cause the metal particles to be joined together by alloying, and to cause the volatile substance to be driven off from the body in order to leave minute voids which render the body porous and capable of absorbing lubricant.

My copending application specifies the use of finely divided lead in the bearing composition in order to make a softer bearing. I have found that if lead can be uniformly distributed throughout the mass of the bearing structure, the bearing will have the property of being more readily machineable and its bearing surface can be given a higher degree of polish than a hard bearing. Such a bearing has the property of yieldability to slight lateral vibrations of the shaft which it supports and hence tends to absorb the vibrations of the shaft and to hinder their transmission to a machine part to such extent that very little sound is produced. Hence such a bearing is desirable for use in office and household appliances.

The process of making a bearing composition including lead as disclosed in my copending application will not produce a composition in which the lead is distributed with that degree of uniformity which may be necessary to obtain all the advantages mentioned herein. Although the lead is uniformly distributed in the briquetted mixture before sintering, during the sintering operation the lead will separate from the other ingredients and will ooze or sweat out, appearing as globules upon the surface of the sintered form. While the cause for this is not exactly known it is believed now to be due to the fact that there are some metallic oxides present within the structure which prevent the cohesion of the lead and copper. If the copper particles are coated with copper oxide, instead of coating the copper particles and flowing into the irregularities and pores thereof, the molten lead is permitted to settle to the bottom of the briquetted form during the sintering process due to the higher specific gravity of the lead, or is extruded when the bearing cools as stated. I have found that I can prevent segregation and sweating out of the lead if I put with the mixture of metal powders before briquetting a small quantity of a solid deoxidizing agent in finely divided form. This agent should be one which does not leave a residue which would be objectionable in bearings. I have found phosphorus to be suitable for this purpose and I prefer to use it in the form of phosphor-tin which can be finely divided. The phosphorus combines with the oxygen of the oxides of the metals to form an oxide of phosphorus, and the tin component of the phosphor-tin alloys with the copper. The oxides of the metals will be reduced so that the copper particles will be free of copper-oxide coating. Then the lead may coat the copper particles and flow into the irregularities or pores thereof. At the highest sintering temperature the lead may alloy to some extent with the copper, but will separate out after the sintered body is cooled. But since segregation and sweating out is prevented, the lead will remain somewhat uniformly distributed throughout the mass, as appears from microscopic examination of a specimen.

In the examples to be given the parts of the ingredients are by weight.

One example of a process which includes the present invention is as follows, the proportions by weight of the mixture are:

| | Parts |
|---|---|
| Copper | 90 |
| Tin | 8 |
| Lead | 10 |
| Phosphor-tin | 2 |
| Graphite | 6 |
| Salicylic acid | 2 to 4 |

These ingredients are mixed in a very finely divided state by a mechanical mixer for approximately thirty minutes and the mixture is briquetted at a pressure of approximately 75,000 pounds per square inch into an article of the desired shape, such as a bearing. The articles are packed in sintering boxes with charcoal, or other suitable material which excludes oxygen or produces a neutral atmosphere, and are heated at a temperature of about 1425° Fahrenheit for about three hours. This time and temperature is found sufficient to cause the alloying of the metal particles and to cause the volatile matter, such as salicylic acid, to be expelled in order to leave minute voids which are interconnected in order to form a porous structure capable of absorbing lubricant. The graphite also assists in producing porosity.

After the sintering operation the sintering boxes are withdrawn from the sintering furnace and are cooled to nearly room temperature before the contents are removed. Bearing bushings are squeezed to the proper size by concentric punch and die members and are then impregnated with lubricant by soaking them for about 1½ hours in oil having a paraffin base and heated to a temperature of about 250° Fahrenheit. In the sizing operation the bushing is placed over a mandrel and the mandrel and bushing are forced through a die which is concentric to the mandrel and causes the cylindrical wall of the bushing to be squeezed against the mandrel which causes the inside diameter of the bushing to be reduced to the desired size. As the mandrel is withdrawn from the bushing the inner surface is polished by the mandrel. The presence of lead in the bearing structure causes the bushing to receive a more highly polished surface than otherwise.

It will be understood however that the present invention is not limited to the use of phosphor tin with copper and lead and other materials in the proportions mentioned in the example. Another formula for the mixture of ingredients which may be briquetted and sintered to make a porous metal body is as follows:

| | Parts |
|---|---|
| Copper | 68 |
| Lead | 25 |
| Graphite | 5 |
| Phosphor tin | 2 |

Salicylic acid may be used if desired. The presence of lead to a substantial degree in mixture and the absence of tin makes phosphor-tin the more necessary in order that the lead will remain somewhat uniformly distributed. It will be understood however that in the preceding example the phosphor-tin is useful in substantially eliminating the sweating out of the lead during the sintering operation.

In my copending application Serial No. 45,287 filed July 22, 1925, I have disclosed the manufacture of porous metal bodies containing metals which do not alloy or only partially alloy, such as copper and lead, by using in the mixture of powdered ingredients a metallic powder comprising solid particles each of which is a mixture of the metals. In the case of a mixture of lead and copper, the lead is not alloyed appreciably with the copper but coats the copper particle or fills the crevices and pores thereof. One example of a mixture given in this copending application is 94 parts copper-lead mixture powder, 6 parts of a filler such as graphite, and 2 to 4 parts of a volatile void forming substance such as salicylic acid. The process of mixing and sintering is the same as for the preceding examples. There is less segregation of the lead when this method is followed than in case of making bodies with lead powder and copper powder without using a deoxidizer such as phosphorus. But this process does not produce a body in which the lead is substantially uniformly distributed.

It has been found that substantially uniform distribution of the lead can be obtained by the addition of a small amount of phosphorus. One example of a mixture for producing a soft porous bronze is 90 parts of copper-lead mixture powder, 10 parts tin, 8 parts natural graphite, ½ part of a volatile flux, such as ammonium chloride, and ½ part of phosphor-tin. This mixture is briquetted and sintered in the manner stated for the preceding examples.

While the form of embodiment of the present invention as herein disclosed, constitutes a preferred form, it is to be understood that other forms might be adopted, all coming within the scope of the claims which follow.

What is claimed is as follows:

1. The process of making a porous metal body which consists in compressing a mixture of finely divided ingredients including copper and lead and a deoxidizer, and in heating for a time and at a temperature sufficient to effect the reduction of metallic oxides and to melt the lead but not the copper.

2. The process of making a porous metal body which consists in compressing a mixture of finely divided ingredients including metals which do not alloy or only partially alloy and a deoxidizer and in heating for a time and at a temperature sufficient to effect the reduction of metallic oxides and to melt the metal having the lower melting point but not to melt the metal having the higher melting point.

3. The process of making a porous metal body which consists in compressing a mixture of finely divided ingredients including copper, lead and phosphor-tin, and in heating for a time and at a temperature sufficient to cause the phosphorous component of phosphor-tin to reduce the metallic oxides and the tin component of phosphor tin to alloy with the copper and the lead to be melted, but not to melt the copper.

4. A self lubricating porous bearing material comprising a copper alloy and in addition a substantial proportion of lead uniformly distributed throughout the material in an unalloyed state by means of a deoxidizer ingredient.

5. A self lubricating porous bearing material comprising a copper alloy and in addition more than ten per cent of the copper alloy weight of lead uniformly distributed throughout the material in an unalloyed state by means of a deoxidizer ingredient.

6. A self lubricating porous bearing material comprising a copper alloy and in addition more than twenty per cent of the copper alloy weight of lead uniformly distributed throughout the material in an unalloyed state by means of a deoxidizer ingredient.

7. A self lubricating porous bearing material comprising a copper alloy and in addition more than thirty per cent of the copper alloy weight of lead uniformly distributed throughout the material in an unalloyed state by means of a deoxidizer ingredient.

8. A self lubricating porous bearing material comprising: porous bronze and a substantial proportion of unalloyed lead uniformly distributed throughout the porous structure.

9. A self lubricating porous material comprising porous bronze and a substantial proportion of uniformly distributed lead held against segregation by a surface bond with the porous bronze.

In testimony whereof I hereto affix my signature.

HARRY M. WILLIAMS.